(12) United States Patent
Rosenfellner et al.

(10) Patent No.: US 6,264,724 B1
(45) Date of Patent: Jul. 24, 2001

(54) PROCESS FOR THE PRODUCTION OF SPONGY METAL

(75) Inventors: Gerald Rosenfellner, St.Peter/Au; Jörg Diehl, Linz, both of (AT)

(73) Assignee: Voest-Alpine Industrieanlagenbau GmbH, Linz (AT)

( * ) Notice: Subject to any disclaimer, the term of this patent is extended or adjusted under 35 U.S.C. 154(b) by 0 days.

(21) Appl. No.: 09/142,187

(22) PCT Filed: Mar. 3, 1997

(86) PCT No.: PCT/AT97/00042
§ 371 Date: Sep. 2, 1998
§ 102(e) Date: Sep. 2, 1998

(87) PCT Pub. No.: WO97/33003
PCT Pub. Date: Sep. 12, 1997

(30) Foreign Application Priority Data

Mar. 5, 1996 (AT) .................................... 417/96

(51) Int. Cl.⁷ .................................... C21B 11/00
(52) U.S. Cl. .................... 75/500; 75/446; 75/475; 75/492
(58) Field of Search ............... 75/492, 446, 500, 75/475

(56) References Cited

U.S. PATENT DOCUMENTS

| | | |
|---|---|---|
| 3,864,122 | 2/1975 | Seelig et al. . |
| 5,413,622 | * 5/1995 | Greenwalt ............... 75/446 |
| 5,676,732 | * 10/1997 | Viramontes-Brown et al. ...... 75/446 |
| 5,958,107 | * 9/1999 | Greenwalt ............... 75/492 |
| 5,997,608 | * 12/1999 | Diehl et al. ............... 75/446 |
| 5,997,609 | * 12/1999 | Diehl et al. ............... 75/492 |

FOREIGN PATENT DOCUMENTS

| | | |
|---|---|---|
| 396255 | 7/1993 | (AT) . |
| 2027350 | 8/1990 | (CA) . |
| 0388395 | 9/1990 | (EP) . |
| 2139958 | 1/1973 | (FR) . |

* cited by examiner

*Primary Examiner*—Melvyn Andrews
(74) *Attorney, Agent, or Firm*—Ostrolenk, Faber, Gerb & Soffen, LLP

(57) ABSTRACT

A plant for producing sponge metal, in particular sponge iron, from charging materials consisting of metal ore or iron ore respectively, preferably in lumps and/or pellets, and optionally fluxes, comprising at least one first gas source (1, 3) dispensing a CO— and $H_2$- containing feedgas, a $CO_2$ elimination plant (17, 17') and optionally a heating means (22, 25) for the feedgas from the first gas source (1, 3) is provided with a reduction reaction (20) which forms a further gas source for a CO— and $H_2$-containing feedgas and serves for receiving metal ore, a reducing-gas feed duct (19) leading to this reduction reactor (20) and an export-gas discharge duct (31) from said further reduction reactor (20), wherein a conveying duct (30) for at least a portion of the export gas formed in the reduction reactor (20) and serving as a feedgas is flow-connected with the reducing-gas feed duct (19) of the reduction reactor (20) via a $CO_2$ elimination plant and optionally a heating means. To increase economic efficiency, the plant is characterized in that at least two $CO_2$ elimination plants (17, 29, 17', 29') are provided which are adapted to be connectable in parallel and at least one of which is connectable with the conveying duct (30) for the export gas that is produced in the reduction reactor (20) forming the further gas source and that is conducted as a recycle gas, and at least one $CO_2$ elimination plant (17, 17') for the feedgas from the first gas source is provided and each of the $CO_2$ elimination plants is flow-connectable with the reduction reactor (20) forming the further gas source (FIG. 1).

11 Claims, 3 Drawing Sheets

PROCESS FOR THE PRODUCTION OF SPONGY METAL

Figure 1:
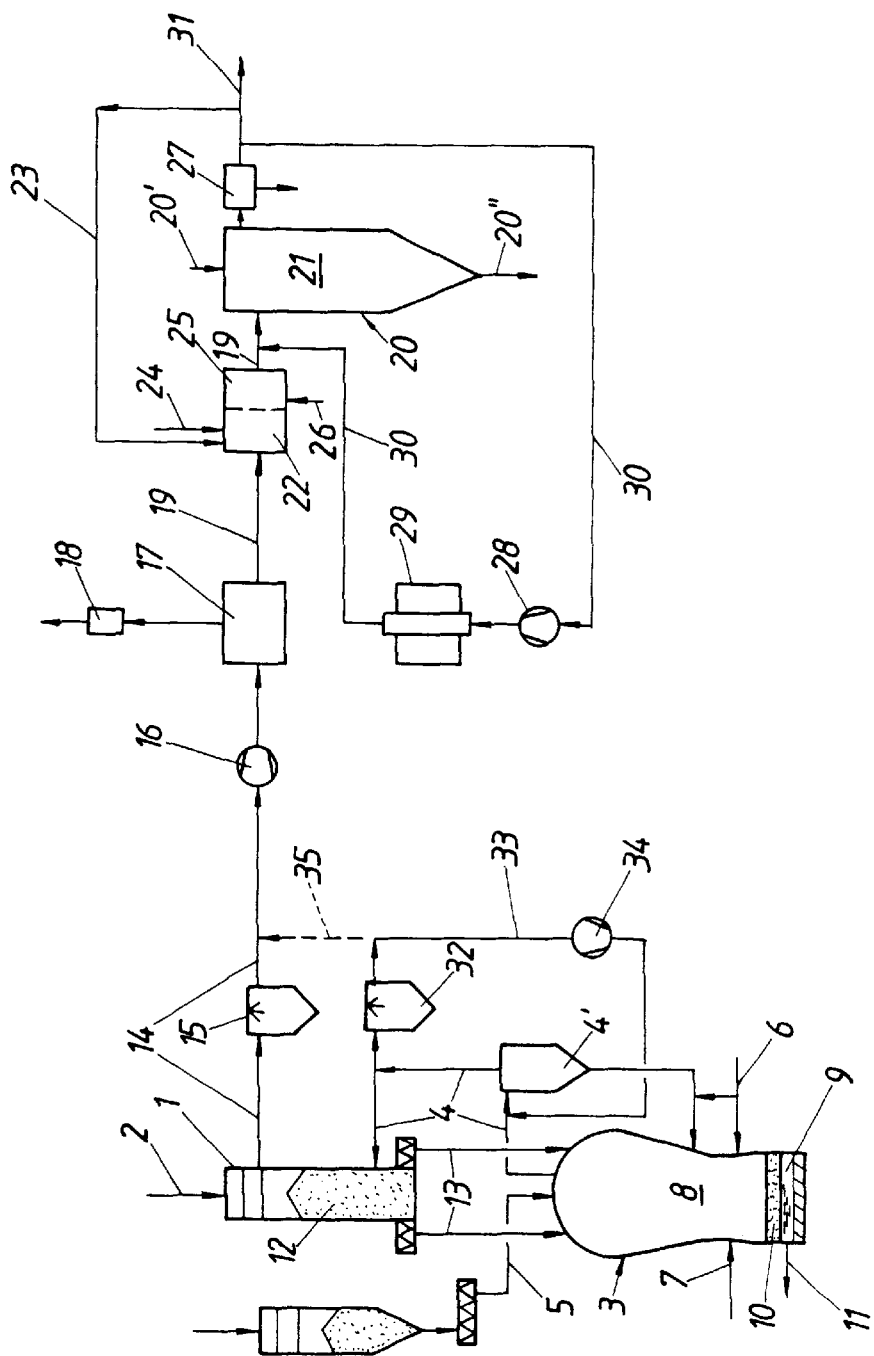

The invention relates to a plant and method for producing sponge metal, in particular sponge iron, from charging materials consisting of metal ore or iron ore respectively, preferably in lumps and/or pellets, and optionally fluxes, comprising at least one first gas source dispensing a CO— and $H_2$-containing feedgas, a $CO_2$ elimination plant and optionally a heating means for the feedgas from the first gas source and a reduction reactor which forms a further gas source for a CO— and $H_2$-containing feedgas and serves for receiving the metal ore, a reducing-gas feed duct leading to this reduction reactor, an export-gas discharge duct leading out of this reduction reactor and a bringing-out means for the reduction product formed in this reduction reactor, wherein the $CO_2$-eliminated feedgas from the first gas source is conducted into the reducing-gas feed duct through a discharge duct and onward into the reduction reactor, and wherein a conveying duct for at least a portion of the export gas formed in the reduction reactor and serving as a feedgas is flow-connected with the reducing-gas feed duct of the reduction reactor via a $CO_2$ elimination plant and optionally a heating means.

The term "sponge metal" is understood to refer to a solid end or intermediate product produced from a metal oxide by direct reduction, namely exclusively via the solid phase, i.e. without the necessity to pass via a liquid intermediate product.

An arrangement of the above-described kind is known from AT-B-396.255. AT-B-396.255 relates to a plant for producing liquid pig iron and sponge iron, from charging substances comprising iron ore and fluxes, with a first reduction reactor for iron ore, a melter gasifier, a feed duct for a reducing gas formed in the melter gasifier connecting the melter gasifier with the first reduction reactor, a conveying duct for the reduction product formed in the first reduction reactor connecting the first reduction reactor with the melter gasifier, with an export-gas discharge duct departing from the first reduction reactor, with feed ducts for oxygen-containing gases and carbon carriers opening into the melter gasifier, and with at least one additional reduction reactor for receiving metal ore, in particular further iron ore, a reducing-gas feed duct to this reduction reactor, an export-gas discharge duct leading out of this further reduction reactor and a discharging means for the reduction product formed in this further reduction reactor, wherein the export-gas discharge duct of the first reduction reactor opens into a $CO_2$ elimination plant from which the reducing-gas feed duct for the additional reduction reactor departs and opens into the additional reduction reactor and wherein a conveying duct for at least a portion of the export gas formed in the further reduction reactor is flow-connected with the reducing-gas feed duct for the further reduction reactor via the above-mentioned $CO_2$ elimination plant.

In this method therefore the portion of the reducing gas formed in the melt-down gasifying zone that incurs as a surplus gas and is supplied to the further reduction zone, after scrubbing in a scrubber is mixed with the export gas from the first reduction zone and is subjected to $CO_2$ removal together with the same. Admixture is thus effected prior to $CO_2$ elimination, so that for the two gas streams forming a gas mixture the same conditions will prevail for $CO_2$ elimination.

By recirculating export gas obtained from the further reduction zone, enriching of nitrogen is caused in the reducing gas supplied to this further reduction zone. Nitrogen passes i.a. into the gas cycle, as it is employed as a conveying gas for dusts of the reducing gases or export gases respectively, which are recycled to the melter gasifier or the further reduction zone respectively. This nitrogen, which is not involved in the reduction process and thus has to be conveyed along solely as ballast, increases the gas volume to be conveyed and thus causes an increase in the pressure drop inside the further reduction reactor as well as an increase in energy expenditures. Effecting a satisfactory degree of nitrogen removal from the reducing gas supplied to the further reduction zone necessitates high costs; the $CO_2$ elimination unit would have to be adjusted to a mode of operation sluicing out more nitrogen, which would however entail a loss in reductants, as it is feasible only with difficulty to adjust a $CO_2$ elimination plant in such a way that it will on the one hand yield a maximum of reductants and on the other hand sluice out a maximum of nitrogen.

A further disadvantage of the prior art, which arises due to the $CO_2$ elimination of the mixed gas, resides in the fact that the $CO_2$ elimination plant with regard to the ratio of reductants/oxidants and the $CO/CO_2$ ratio is also only adjustable to the chemical composition of the mixed gas. For this reason it is f.i. not feasible to have regard to the fact that one of the desired gases would have to be freed from $CO_2$ to only a slighter extent, which would lead to an increase in the content of reductants.

The invention aims at avoiding these disadvantages and difficulties and has as its object to provide a plant of the initially described kind and a method for producing sponge metal, in particular sponge iron, which enable improved economic efficiency and an increase in production, notably because the nitrogen content in the recirculated gas stream can be markedly lowered without losing reductants and without the need for special energy expenditures. It is a particular object of the invention to provide a particularly avid reducing gas for the further reduction zone, i.e. one that is highly reactive with respect to direct reduction. If possible, the ratio reductants/oxidants, the $CO/CO_2$ ratio and also the heating value are to be enhanced.

In a plant of the initially described kind this object is achieved in that at least two $CO_2$ elimination plants are provided which are adapted to be connectable in parallel and at least one of which is connectable with the conveying duct for the export gas that is produced in the reduction reactor forming the further gas source and that is conducted as a recycle gas, and at least one $CO_2$ elimination plant for the feedgas from the first gas source is provided and each of the $CO_2$ elimination plants is flow-connectable with the reduction reactor forming the further gas source.

A coke or coal gasification plant, such as f.i. a Lurgi gasifier, can serve as the first gas source, wherein f.i. a feedgas of the following chemical composition is formed:

TABLE

| CO | 15.8–24.6 |
|---|---|
| $H_2$ | 20–39.8 |
| $CO_2$ | 10–32 |
| $CH_4$ | 3.5–16.5 |
| CnHm | 0.4–1.1 |
| $N_2$ | 0.4–44.2 |

A preferred embodiment is characterized in that the first gas source is formed by a plant for producing liquid pig iron or liquid steel pre-products from iron ore, comprising at least one first reduction reactor for iron ore, a melter gasifier, a feed duct for a reducing gas formed inside the melter gasifier connecting the melter gasifier with the first reduction reactor, a conveying duct for the reduction product formed in the first reduction reactor connecting the first reduction reactor with the melter gasifier, with an export-gas discharge duct departing from the first reduction reactor, with feed ducts for oxygen-containing gases and carbon carriers opening into the melter gasifier and with a tap for pig iron and slag provided at the melter gasifier, wherein the export-gas discharge duct for the export gas formed inside the first reduction reactor is connectable with at least one of the $CO_2$ elimination plants.

With this process, the $CO_2$ elimination plant for the export gas that is conducted as a recycle gas of the further reduction reactor is operated with a view to minimizing the nitrogen contained in the recycle gas, accepting a reduction in the reductants contained in said recycle gas, whereas the $CO_2$ elimination plant for the export gas formed in the first reduction reactor is operated with a view to optimizing the reductants, hence aiming at an optimum $CO_2$ elimination (sluicing-out or conversion) while maintaining as high a portion of reductants as possible. The reducing gas that in accordance with the invention is employed for the further reduction reactor has a markedly better ratio of reductants/oxidants, a higher hydrogen content, a lower nitrogen content and also an enhanced $CO/CO_2$ ratio. It is therefore feasible to reduce the amount of reducing gas supplied to the further reduction reactor by effecting the same amount of reduction work, which results in reduced pressure losses. This is accompanied by reduced gas quantities having to be circulated, i.e. by savings in terms of energy.

Preferably, the $CO_2$ elimination plants by their ducts arranged at their exit ends run into the reducing-gas feed duct for the additional reduction reactor.

It is advantageous if the two $CO_2$ elimination plants at their entry ends are optionally connectable with each other for the purpose of gas exchange by a compensation-connecting duct. Hereby, gas compositions changing in the reduction process can be taken into account in an optimum manner.

It is of particular advantage if a separate gas compressor is connected upstream of each of the $CO_2$ elimination plants. It is then feasible to deliver the different gas qualities to the $CO_2$ elimination plants at different pressure levels.

Herein, again, suitably the conveying duct conveying the recycle gas is provided with a gas compressor and downstream of the gas compressor the conveying duct is flow-connectable by one branch duct each with one gas compressor arranged upstream of a $CO_2$ elimination plant.

A preferred embodiment is characterized in that the export-gas discharge duct of the first reduction reactor by one branch duct each is connectable with one gas compressor arranged upstream of a $CO_2$ elimination plant. This embodiment not only enables an optimum division of the different gas streams and achievement of optimum pressure levels for these gas streams for further treatment of the same, but also renders it possible to exchange the gas compressors among each other or to do maintenance work on one of the gas compressors while continuing to effect reduction.

A method for producing sponge metal, in particular sponge iron, from charging materials comprising metal ore or iron ore respectively, preferably in lumps and/or pellets, and optionally fluxes in a plant of the above-described kind, wherein a CO— and $H_2$-containing feedgas from a first gas source is subjected to $CO_2$ elimination and optionally to heating and as an at least largely $CO_2$-free reducing gas is supplied to at least one reduction zone forming a further gas source, to serve for the direct reduction of metal ore, in particular iron ore, and after reaction with the ore is withdrawn as an export gas and said export gas at least partially is also subjected to $CO_2$ elimination and optionally to heating as a recycle gas for the reduction zone, is characterized in that both the feedgas from the first gas source and the recycle gas recycled from the reduction zone forming a further gas source are each subjected to $CO_2$ elimination separately from one another.

A preferred process variant is characterized in that the feedgas is generated by directly reducing iron ore to sponge iron in a first reduction zone to produce liquid pig iron or liquid steel pre-products from iron ore, the sponge iron is melted in a melt-down gasifying zone under the supply of carbon carriers and oxygen-containing gas and a CO— and $H_2$-containing reducing gas is produced which is introduced into the first reduction zone, is reacted there and withdrawn as the export gas that forms the feedgas.

Minimization of the nitrogen content in the recycle gas can be effected in a particularly advantageous manner if $CO_2$ elimination of the recycle gas is effected by the pressure-swing adsorption method.

Under special circumstances, in cases where particularly low-grade coal is employed in the melter gasifier, if a portion of the reducing gas from the melt-down gasifying zone is admixed to the export gas of the first reduction zone this particular portion is subjected to tar extraction prior to $CO_2$ elimination, whereas the recycle gas from the second reduction zone is subjected to $CO_2$ elimination with its tar content unchanged.

Suitably, the recycle gas from the further reduction zone is divided into two partial streams and one partial stream is subjected to $CO_2$ elimination separately and the other partial stream is admixed to the feedgas or export gas respectively from the first gas source or first reduction zone respectively before the latter undergoes $CO_2$ elimination and is subjected to a separate $CO_2$ elimination together with the same.

A further advantageous variant is characterized in that the feedgas or export gas respectively from the first gas source or first reduction zone respectively is divided into two partial streams and one partial stream is admixed to the recycle gas from the second reduction zone, preferably at least to a partial stream of the same, and that each partial stream is subjected to $CO_2$ elimination independently of the partial stream that has been branched off.

For adjusting pressure levels of different heights in the $CO_2$ elimination plants, advantageously each of the partial streams of the export gas or recycle gas respectively, optionally after mixture with a partial stream of the recycle gas or export gas respectively, is compressed separately before $CO_2$ elimination is effected, namely independently of the compression of the other partial stream. By different pressure levels, different efficiencies can be adjusted for the sluicing-out of individual components.

The invention further relates to a marketable product, such as rolling stock produced from pig iron or steel pre-products, produced by the method according to the invention.

Figure 2:
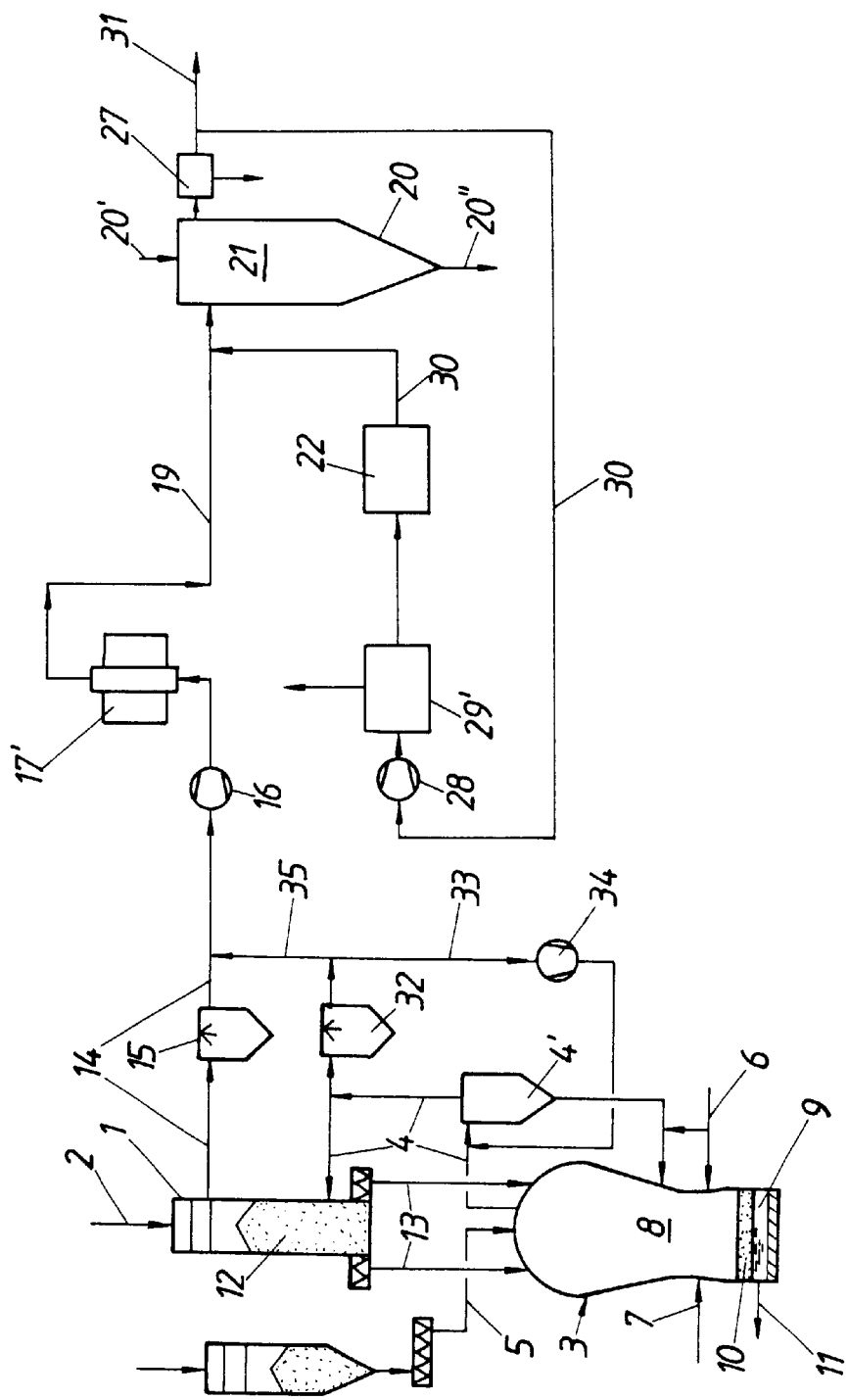
Figure 3:
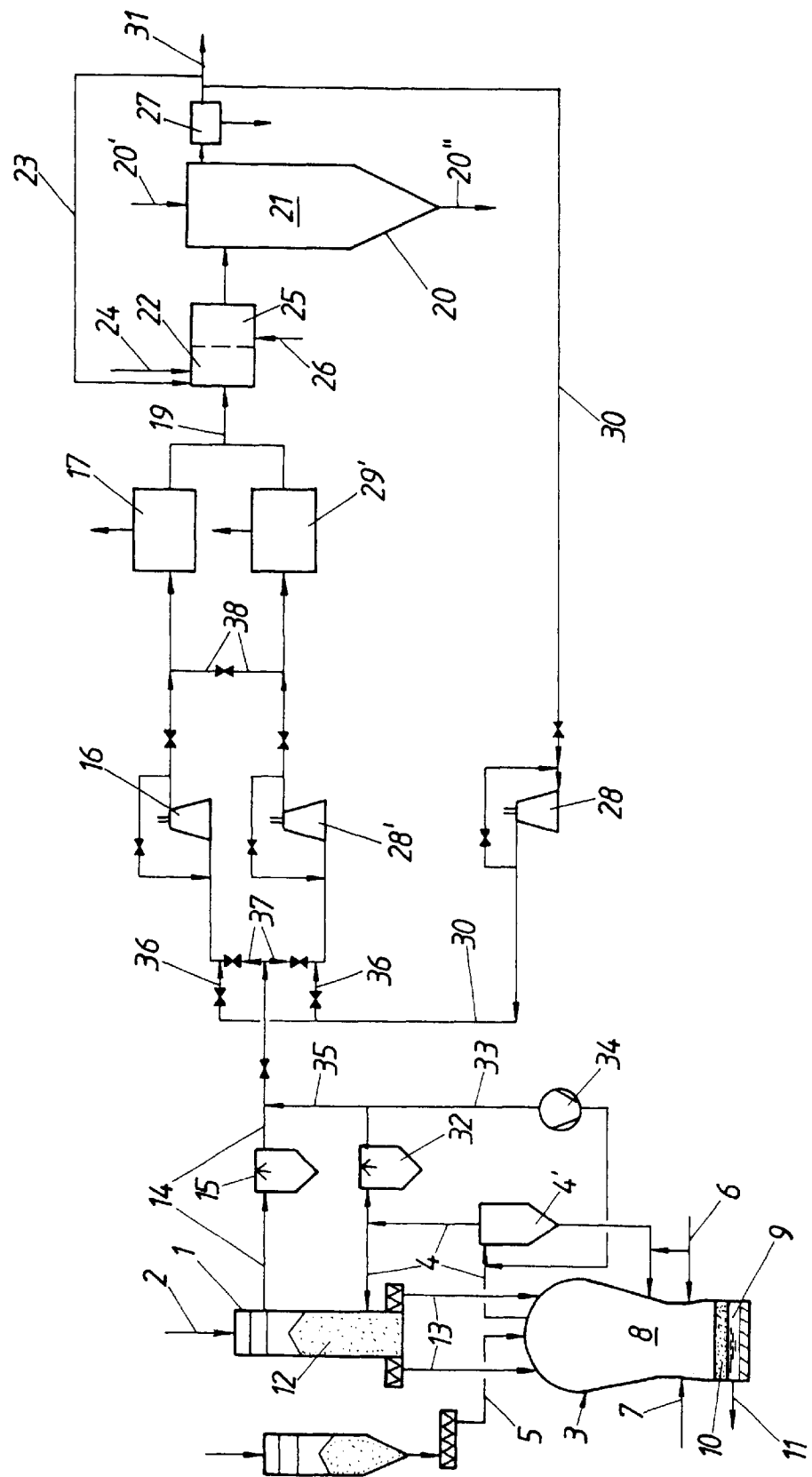

In the following, the invention is explained in greater detail with reference to three exemplary embodiments illustrated schematically in the drawings, wherein each of the FIGS. 1 to 3 represented in the drawings illustrates a process scheme in accordance with one embodiment of the invention each.

To a first shaft furnace forming a reduction reactor 1, lumpy iron ore and/or pelletized iron ore is top-charged via a conveying means 2 through a sluice system not illustrated in the drawing, optionally along with fluxing materials under the formation of a moving bed. The shaft furnace 1 communicates with a melter gasifier 3, in which from coal and oxygen-containing gas a reducing gas is formed which is fed to the shaft furnace 1 via a feed duct 4, a gas purification means 4' for dry dedustification being optionally provided inside the feed duct 4.

The term "moving bed" is generally understood to refer to a continuously moving material stream, the movable particles of which come into contact with a flowing reducing gas. Preferably, a material stream is utilized which moves continuously downward by gravity.

Instead of a shaft furnace 1, it is f.i. also feasible to provide a reactor incorporating a Venturi-fluidized bed, a circulating fluidized bed, a fluidized bed or a reactor incorporating a traveling grate or a rotary tubular kiln as the reduction reactor.

The melter gasifier 3 has a feed duct 5 for solid carbon carriers, a feed duct 6 for oxygen-containing gases and optionally feed ducts 7 for carbon carriers that are liquid or gaseous at room temperature, such as hydrocarbons, and for calcined fluxes. Inside the melter gasifier 3, molten pig iron 9 and molten slag 10 collect below the meltdown gasifying zone 8 and are run off through a tap 11.

Along with the fluxes calcined in the direct reduction zone 12, the iron ore which has been reduced to sponge iron in a direct reduction zone 12 inside the shaft furnace 1 is introduced through a conveying duct 13 connecting the shaft furnace 1 with the melter gasifier 3, f.i. by means of delivery worms etc. To the upper portion of the shaft furnace 1, an export-gas discharge duct 14 is connected for the export gas which forms from reducing gas in the direct reduction zone 12.

The export gas withdrawn through the export-gas discharge duct 14 is first of all subjected to purification in a scrubber 15, in order to free it from dust particles as completely as possible and to reduce the water vapor content, so that it is subsequently available for further use. Thereupon the export gas by means of a gas compressor 16 passes into a $CO_2$ elimination plant 17 (f.i. a $CO_2$ scrubber or a pressure-swing adsorption plant) in which it is freed from $CO_2$ as completely as possible. The offgas exiting the $CO_2$ removal plant 17 is optionally fed to a desulfurization means 18. Via a reducing-gas feed duct 19, the export gas thus purified from $CO_2$ is supplied to a second reduction reactor which is constructed as a shaft furnace 20 and which, like the first shaft furnace 1 also has a moving bed and is operated according to the counter current principle. In this second shaft furnace 20, metal ore, preferably iron ore in lumps and/or pellets is directly reduced in a reduction zone 21. The ore feed duct is designated by numeral 20' and the means for bringing out sponge iron by numeral 20".

In the second shaft furnace 20 it is also feasible to subject metal ores, such as copper, lead, nickel and cobalt ores, to partial or complete reduction.

As the export gas has been considerably cooled by undergoing purification, it is subjected to heating before being introduced into the second reduction shaft furnace 20. Heating is preferably effected in two stages: first of all, the purified export gas in a first stage is subjected to indirect heating, with a heating means 22 employed for this purpose being constructed as a heat exchanger. The heat exchanger 22 (recuperator) is operated by purified export gas which is withdrawn from the second reduction shaft furnace 20 through a duct 23. In addition to this, oxygen-containing gas (oxygen is present in molecular form), such as air, is supplied to the burner of the heat exchanger 22 via a duct 24. Subsequently, the heated export gas is subjected to post-combustion, namely in the post-combustion means 25 where a portion of the purified export gas is burned under oxygen supply 26. By this method, the purified export gas attains the temperature required for reduction in the second reduction shaft furnace 20, which lies in a temperature range of between 600 and 900° C. For reducing gases that are rich in $H_2$ even a temperature range of above 900° C. may be contemplated.

The export gas withdrawn from the second reduction shaft furnace 20 is also subjected to purification and cooling in the export-gas scrubber 27, in order to purify it from dust particles and to reduce the water vapor content, whereupon it can be passed on for further utilization. A portion of the export gas is supplied to the heat exchanger 22 through the duct 23. Another portion of the export gas arising in the second reduction shaft furnace 20 via a gas compressor 28 is fed to a separate $CO_2$ elimination plant 29, which according to FIG. 1 is constructed as a reformer, namely via the conveying duct 30, and after $CO_2$ elimination is then available to the second reduction shaft furnace 20 as a recycle reducing gas. A portion of the export gas of the second reduction shaft furnace 20 is passed onward through the export gas duct 31 for other uses.

A portion of the export gas formed in the further reduction shaft furnace 20 can be employed for firing the reformer 29.

A portion of the reducing gas formed in the melter gasifier 3 is recirculated back into the feed duct 4 via a scrubber 32 and via a duct 33 with gas compressor 34, in order to condition the reducing gas which exits the melter gasifier 3 in a very hot state before it enters the gas purifying means 4', particularly in order to cool it down to a temperature range favorable to the direct reduction process in the shaft furnace 1. Through a compensating duct 35 it is feasible to optionally admix excess reducing gas to the export gas leaving the shaft furnace 1 with a view to maintaining a constant system pressure. Such excess reducing gas is optionally subjected to tar extraction, f.i. in a detarring means in which tar from the excess reducing gas deposits on a bulk material as it is conducted through a bed formed of a bulk material, in order to exclude the possibility of tar depositing in the $CO_2$ elimination plant.

The export gas from the further reduction reactor 20 that has been subjected to $CO_2$ elimination in the reformer 29 does not require heating before recycling it to the further reduction reactor 20, on account of having undergone heating inside the reformer, for which reason the conveying duct 30 runs into the portion of the reducing-gas feed duct 19 that is located between the heating means 22, 25 and the further reduction reactor 20. Here, the reformer itself acts as the heating plant.

In accordance with the process variant illustrated in FIG. 2, the $CO_2$ elimination plant for the export gas from the first reduction reactor is constructed as a reformer 17', which obviates the need to subject to further heating the gas that exits the reformer 17' and is thereupon available as a reducing gas for the further reduction shaft 20. In this case, too, the $CO_2$ elimination plant 17' itself serves as the heating means.

For the export gas recycled from the further reduction reactor 20 as a recycle gas, the $CO_2$ elimination plant is constructed as a $CO_2$ scrubber or as a pressure-swing adsorption plant 29'. In this case, the gas that is obtained from this plant 29' and serves as a reducing gas for the further reduction reactor 20 has to be subjected to heating in a heating plant 22'.

In accordance with the process variant illustrated in FIG. 3, the two $CO_2$ elimination plants 17 and 29', each of which is allocated to a gas stream from the first reduction reactor 1 or from the second reduction reactor 20, are constructed as $CO_2$ scrubbers or as pressure-swing adsorption plants. The gases exiting the two $CO_2$ elimination plants 17 and 29' run into a common reducing-gas feed duct 19 and together are further subjected to heating in a heating means 22 and a post-combustion means 25.

Gas compression of the gases supplied to the $CO_2$ elimination plants 17 and 29' is effected bit means of two gas compressors 16 and 28' that are connected in parallel and one additional gas compressor 28, which is provided inside the conveying duct 30 and can optionally be connected in series to one of the two gas compressor 16 and 28' that are connected in parallel. According to this concept it is feasible to adjust a separate operation of the gas compressors 28 and 28' for the export gas that is recycled via the conveying duct 30, which compressors are then connected in series (28 serially to 28'), with the gas compressor 16 being operated at full capacity.

The export gas of the further reduction reactor that is recycled via the conveying duct 30 can be divided into two partial streams by means of branch ducts 36, and each partial stream can be fed into the export-gas discharge duct 14 of the first reduction reactor 1 directly, through the two gas compressors 16 and 28' that are connected in parallel. Further, the export gas from the first reduction reactor 1 is divisible into two partial streams by means of the branch ducts 37, which streams can be fed to the gas compressors 16 and 28'. Hereby it is feasible to adjust the gas compositions supplied to the $CO_2$ elimination plants 17 and 29' to the modes of operation of these $CO_2$ elimination plants 17 and 29' in an optimum manner, by varying the percentage of the recycled export gas from the further reduction zone 21 which is contained in. the export gas from the first reduction zone 12.

The two ducts leading from one gas compressor 16 or 28' each to a $CO_2$ elimination plant 17 or 29' are connectable by means of a compensation-connecting duct 38, thereby enabling the separate delivery to the $CO_2$ elimination plants 17 and 29' of different gas qualities at different pressure levels.

From FIG. 3 it can be seen that all gas ducts are equipped with adjustable valves that can optionally be controlled as a function of gas compositions and gas quantities and temperatures etc. The foregoing also applies to the gas ducts represented in FIGS. 1 and 2.

In the following, the invention is explained in greater detail with reference to an example (unless indicated otherwise, listed values in all tables are volume percent and have been rounded off):

In the production by the direct reduction method of pig iron in an amount of 80 t/h in reduction reactor 1 and the subsequently arranged melter gasifier 3, formation of an export gas takes place which streams out of the reduction reactor 1 and has a composition as set forth in Table I.

TABLE I

| | |
|---|---|
| CO [%] | 47 |
| $CO_2$ [%] | 25 |
| $H_2$ [%] | 22 |
| $H_2O$ [%] | 2 |
| $H_2S$ ppm | 100 |
| $N_2$, Ar [%] | 3 |
| $CH_4$ [%] | 1 |

This export gas incurs in an amount of 167,411 $Nm^3/h$. It is subjected to $CO_2$ elimination in a $CO_2$ elimination plant 17 constructed as a pressure-swing adsorption plant. In this process, an offgas which is discharged from the $CO_2$ elimination plant 17 incurs in accordance with the following Table II, in an amount of 51,176 $Nm^3/h$.

TABLE II

| | |
|---|---|
| CO [%] | 14 |
| $CO_2$ [%] | 75 |
| $H_2$ [%] | 3 |
| $H_2O$ [%] | 6 |
| $H_2S$ ppm | 300 |
| $N_2$, Ar [%] | 1 |
| $CH_4$ [%] | 1 |

The process gas exiting the $CO_2$ elimination plant 17 incurs in an amount of 116,038 $Nm^3/h$ and has the chemical composition indicated in Table III.

TABLE III

| | |
|---|---|
| CO [%] | 62 |
| $CO_2$ [%] | 3 |
| $H_2$ [%] | 30 |
| $H_2O$ [%] | 0 |
| $H_2S$ ppm | <100 |
| $N_2$, Ar [%] | 4 |
| $CH_4$ [%] | 1 |

It is then, after a heating operation, available as a reducing gas for the further reduction reactor 20. Prior to being heated it is mixed with an export gas escaping from the further reduction reactor 20, which is also subjected to $CO_2$ elimination. The export gas escaping from the further reduction reactor 20 has a composition in accordance with Table IV below. It incurs in an amount of 178,696 $Nm^3/h$.

TABLE IV

| | |
|---|---|
| CO [%] | 39 |
| $CO_2$ [%] | 25 |
| $H_2$ [%] | 21 |
| $H_2O$ [%] | 6 |
| $H_2S$ ppm | <100 |
| $N_2$, Ar [%] | 7 |
| $CH_4$ [%] | 2 |

A portion of this export gas, namely 122,529 $Nm^3/h$, is fed to the $CO_2$ elimination plant 29'. From the latter, an offgas still having a $CO_2$ content escapes in an amount of 46,467 $Nm^3/h$, exhibiting the chemical composition set forth in Table V.

TABLE V

| | |
|---|---|
| CO [%] | 20 |
| $CO_2$ [%] | 67 |
| $H_2$ [%] | 3 |
| $H_2O$ [%] | 5 |
| $H_2S$ ppm | <100 |
| $N_2$, Ar [%] | 4 |
| $CH_4$ [%] | 1 |

The gas which has been purified in said $CO_2$ elimination plant 29' and is now available as a recycle reducing gas for the further reduction reactor 20, namely after mixing with the export gas from the first reduction reactor 1, incurs in an amount of 74,626 $Nm^3/h$ and has the chemical composition shown in Table VI.

TABLE VI

| | |
|---|---|
| CO [%] | 53 |
| $CO_2$ [%] | 1 |
| $H_2$ [%] | 34 |
| $H_2O$ [%] | 0 |
| $H_2S$ ppm | <100 |
| $N_2$, Ar [%] | 10 |
| $CH_4$ [%] | 2 |

After subjecting this gas mixture formed of the two $CO_2$-purified export gases, which has a chemical composition according to Table VII and incurs in an amount of 191,625 $Nm^3/h$, to heating, said gas mixture is supplied to the further reduction reactor 20 for the production of 100 t/h sponge iron.

TABLE VII

| | |
|---|---|
| CO [%] | 55.5 |
| $CO_2$ [%] | 4.7 |
| $H_2$ [%] | 30.3 |
| $H_2O$ [%] | 1.5 |
| $H_2S$ ppm | <100 |
| $N_2$, Ar [%] | 6.5 |
| $CH_4$ [%] | 1.5 |

To afford a comparison to the above method performed in accordance with the invention, the following describes an example in accordance with the prior art, in which there are also produced 80 t/h pig iron and 100 t/h sponge iron.

In a first reduction reactor, export gas is formed in an amount of 167,411 $Nm^3/h$ and having the chemical composition set forth in Table VIII—which is identical with the chemical composition shown in Table I.

TABLE VIII

| | |
|---|---|
| CO [%] | 47 |
| $CO_2$ [%] | 25 |
| $H_2$ [%] | 22 |
| $H_2O$ [%] | 2 |
| $H_2S$ ppm | 100 |
| $N_2$, Ar [%] | 3 |
| $CH_4$ [%] | 1 |

After compression, this export gas is subjected $CO_2$ elimination along with an export gas that has been formed in a further reduction reactor. The export gas recirculated from the further reduction reactor has a composition in accordance with Table IX. It incurs in an amount of 188,872 $Nm^3/h$ and is recirculated in an amount of 128,000 $Nm^3/h$.

TABLE IX

| | |
|---|---|
| CO [%] | 39 |
| $CO_2$ [%] | 25 |
| $H_2$ [%] | 20 |
| $H_2O$ [%] | 6 |
| $H_2S$ ppm | <100 |
| $N_2$, Ar [%] | 8 |
| $CH_4$ [%] | 2 |

After mixing of the two export gases, $CO_2$ elimination is effected, wherein offgas incurs in an amount of 90,174 $Nm^3/h$, having the chemical composition shown in Table X.

TABLE X

| | |
|---|---|
| CO [%] | 13 |
| $CO_2$ [%] | 76 |
| $H_2$ [%] | 3 |
| $H_2O$ [%] | 6 |
| $H_2S$ ppm | 200 |
| $N_2$, Ar [%] | 1 |
| $CH_4$ [%] | 1 |

After a heating operation, the export gas which has been freed from $CO_2$ is available in an amount of 200,552 $Nm^3/h$ as a reducing gas for the further reduction reactor, having the chemical composition set forth in Table XI.

TABLE XI

| | |
|---|---|
| CO [%] | 55.7 |
| $CO_2$ [%] | 5.6 |
| $H_2$ [%] | 28.4 |
| $H_2O$ [%] | 1.4 |
| $H_2S$ ppm | <100 |
| $N_2$, Ar [%] | 7.4 |
| $CH_4$ [%] | 1.5 |

The reacted reducing gas escapes in an amount of 188,872 $Nm^3/h$, having the chemical composition shown in Table IX.

A comparison of the method according to the invention with the prior art reveals that for the reducing gas supplied to the further reduction reactor 20 the reductants/oxidants ratio has been enhanced by roughly 15%. It is at roughly 12.0 with the prior art and at roughly 13.8 in accordance with the invention. The reducing gas formed by a method in accordance with the invention is therefore considerably more avid, i.e. it is of higher reductivity. It has a higher hydrogen content (roughly 2%), and the ratio of $CO/CO_2$ is also markedly enhanced (roughly 19%). In the reducing gas formed according to the invention, $CO_2$ is only found in an amount 84% of that found in the reducing gas formed according to the prior art.

A further considerable advantage of the method according to the invention is to be seen in that the amount of the reducing gas is reduced by roughly 5% over the amount of reducing gas arising with the prior art, so that, firstly, the pressure loss in the further reduction reactor 20 is slighter and, secondly, less gas has to be conveyed, so that investment costs and energy can be saved.

What is claimed is:

1. Method for producing sponge metal from charging materials comprising metal ore and optionally fluxes wherein a $CO_2$, CO—, $H_2$- and tar containing feedgas from a first gas source comprising a melt-down gasifying zone (8) and a first reduction zone (12) is subjected to $CO_2$ elimination and optionally to heating and an at least largely $CO_2$-free reducing gas is supplied to at least one further reduction zone (21) forming a further $CO_2$, CO, nitrogen and tar containing gas source, to serve for the direct reduction of metal ore and which after reaction with the ore is withdrawn as an export gas and said export gas at least partially is also subjected to $CO_2$ elimination as a recycle gas for the reduction zone (21), characterized in that both the feedgas from the first gas source (8, 12) and the recycle gas recycled from the reduction zone (21) are each subjected to $CO_2$ elimination separately.

2. Method according to claim 1, characterized in that the feedgas from said first gas source is generated by directly reducing iron ore to sponge iron in a first reduction zone (12) to produce liquid pig iron or liquid steel pre-products from iron ore, the sponge iron is melted in a melt-down gasifying zone (8) under the supply of carbon carriers and oxygen-containing gas and a $CO_2$, CO— $H_2$ and tar-containing reducing gas is produced which is introduced into the first reduction zone (12), is reacted there and withdrawn as the export gas that forms the feedgas.

3. Method according to claim 1, characterized in that $CO_2$ elimination of the recycle gas is effected by the pressure-swing adsorption method.

4. Method according to claim 2, characterized in that a portion of the reducing gas from the melt-down gasifying zone (8) is subjected to tar extraction and subsequently is admixed with the export gas of the first reduction zone (12) and the recycle gas from the further reduction zone (21) is subjected to $CO_2$ elimination with its tar content unchanged.

5. Method according to claim 1, characterized in that the recycle gas from the further reduction zone (21) is divided into two partial streams and one partial stream is subjected to $CO_2$ elimination separately and the other partial stream is admixed to the feedgas or export gas respectively from the first gas source or first reduction zone (12) respectively before the latter undergoes $CO_2$ elimination and is subjected to a separate $CO_2$ elimination together with the same.

6. Method according to claim 1, characterized in that the feedgas or export gas respectively from the first gas source or first reduction zone (12) respectively is divided into two partial streams and one partial stream is admixed to the recycle gas from the second reduction zone (21), preferably at least to a partial stream of the same, and that each partial stream is subjected to $CO_2$ elimination independently of the partial stream that has been branched off.

7. Method according to claim 5, characterized in that each of the partial streams of the export gas or recycle gas respectively, optionally after mixture with a partial stream of the recycle gas or export gas respectively, is compressed separately before $CO_2$ elimination is effected.

8. Method according to claim 1, characterized in that the reducing gas supplied to the further reduction zone (21) also contains nitrogen and in case of an increased nitrogen content of said reducing gas, the gas pressure of said reducing gas is increased.

9. Method according to claim 1, wherein the sponge metal is sponge iron and the metal ore is iron ore.

10. Method according to claim 1, wherein the metal ore is in the form of lumps or pellets.

11. Method according to claim 2, characterized in that $CO_2$ elimination for the feedgas or export gas respectively from the first gas source or the first reduction zone (12) respectively is effected while maximizing the reductant content, and $CO_2$ elimination for the recycle gas from the further reduction zone (21) is effected optionally with a reduction in the reductants contained in said recycle gas and with minimizing the nitrogen content of the recycle gas.

* * * * *